United States Patent
Muller

(10) Patent No.: US 8,177,056 B2
(45) Date of Patent: May 15, 2012

(54) DRIVE FOR CONVEYOR MEANS OR CONVEYED OBJECTS

(75) Inventor: Erwin Muller, Durnten (CH)

(73) Assignee: WRH Walter Reist Holding AG, Ermatingen (CH)

(*) Notice: Subject to any disclaimer, the term of this patent is extended or adjusted under 35 U.S.C. 154(b) by 84 days.

(21) Appl. No.: 12/743,715

(22) PCT Filed: Nov. 18, 2008

(86) PCT No.: PCT/CH2008/000489
§ 371 (c)(1),
(2), (4) Date: May 19, 2010

(87) PCT Pub. No.: WO2009/065243
PCT Pub. Date: May 28, 2009

(65) Prior Publication Data
US 2010/0270132 A1    Oct. 28, 2010

(30) Foreign Application Priority Data

Nov. 20, 2007  (CH) ...................................... 1791/07

(51) Int. Cl.
*B65G 23/04*    (2006.01)
(52) U.S. Cl. ....................................... 198/834; 198/835
(58) Field of Classification Search .......... 198/833–835, 198/331, 335, 336, 779
See application file for complete search history.

(56) References Cited

U.S. PATENT DOCUMENTS

| | | | | |
|---|---|---|---|---|
| 2,984,522 A * | 5/1961 | Tucker et al. | ................. | 305/100 |
| 3,601,246 A * | 8/1971 | Dubois | ......................... | 198/334 |
| 3,894,627 A * | 7/1975 | Jabbusch et al. | ........... | 198/461.1 |
| 3,985,225 A * | 10/1976 | Baum et al. | ..................... | 198/834 |
| 5,174,437 A * | 12/1992 | Burger | .......................... | 198/842 |
| 5,415,274 A * | 5/1995 | Krismanth et al. | ........... | 198/833 |
| 5,638,937 A * | 6/1997 | Birney et al. | ................. | 198/335 |
| 6,536,583 B2 * | 3/2003 | Luigi | ............................. | 198/832 |
| 6,685,004 B2 * | 2/2004 | Fargo et al. | .................... | 198/330 |
| 7,628,266 B2 * | 12/2009 | Reist | ............................. | 198/779 |
| 2006/0011453 A1 * | 1/2006 | Sedlacek | ....................... | 198/779 |
| 2008/0078158 A1 | 4/2008 | Reist | | |

FOREIGN PATENT DOCUMENTS

WO    2005/113391    12/2005

* cited by examiner

*Primary Examiner* — Mark A Deuble
(74) *Attorney, Agent, or Firm* — Rankin, Hill & Clark LLP

(57) ABSTRACT

A drive has a drive unit, wherein the drive unit includes a central body, a drive means, and a driven means circulating around the central body. Conveyor means or objects to be conveyed are able to be conveyed in a driven section of the drive unit along a conveyor path by way of the driven means. The driven means is mounted with respect to the central body by means of a roller body which circulates around the central body in an orbital track. To this end, the driven means rolls on the central body via rollers of the roller body and thereby the roller body transmits radial pressure forces to the central body. The driven means is driven directly by the drive means. The roller body itself is not driven directly by the drive means, but rather it is moved along solely by the rolling of the driven means on the roller body.

15 Claims, 3 Drawing Sheets

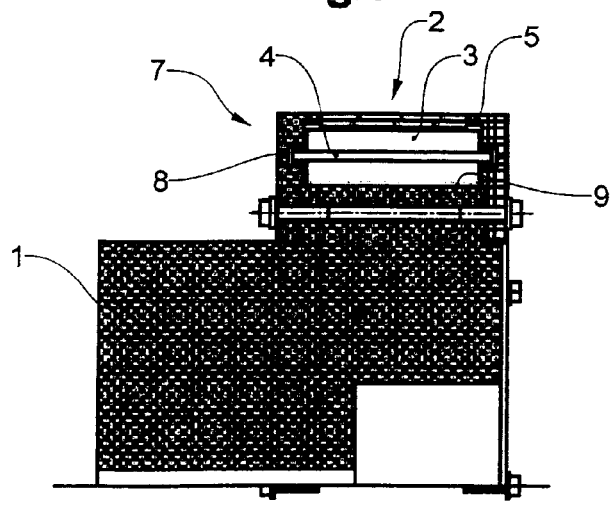
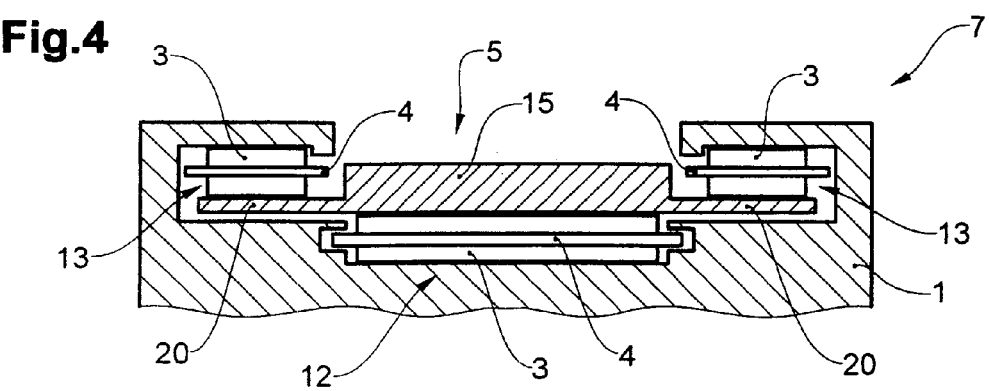
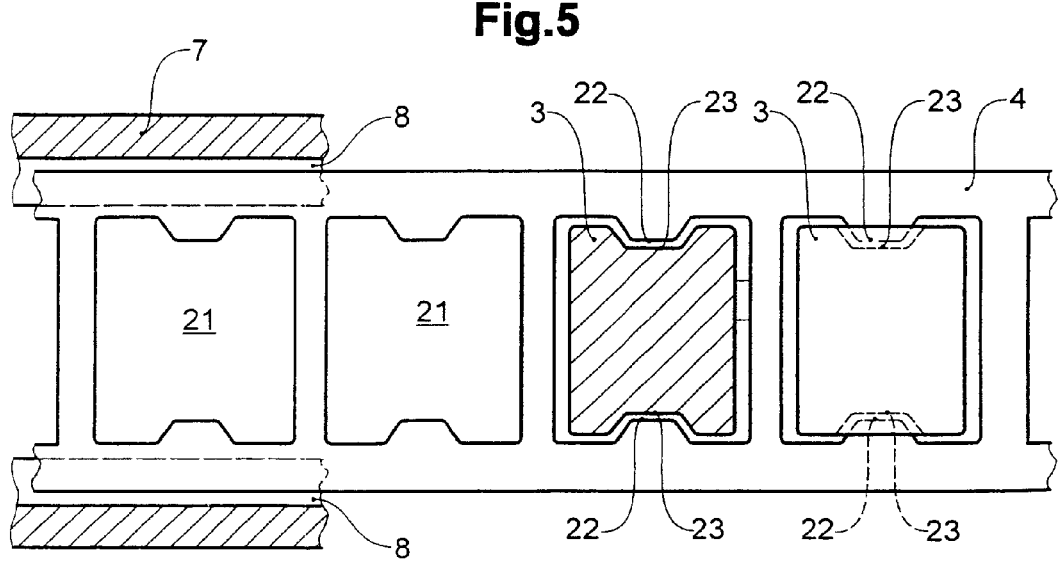

DRIVE FOR CONVEYOR MEANS OR CONVEYED OBJECTS

BACKGROUND OF THE INVENTION

1. Field of the Invention

The invention relates to the field of conveying technology, in particular to a drive for conveyor means or for conveyed objects according to the preamble of claim 1.

2. Description of Related Art

It is known to drive conveyor belts and other conveying systems by means of toothed wheels or chains. Such drives require a deflection along an arc (wheels) and/or are burdened with high frictional losses (chains).

BRIEF SUMMARY OF THE INVENTION

It is therefore the object of the invention to establish a drive of the type initially described for conveying means or conveyed objects, which remedies the disadvantages described above.

The drive thus comprises a drive unit, wherein the drive unit comprises a central body, a drive means, and a driven means circulating around the central body. The drive means serves for the application of driving force to the drive unit. The driven means serves for the transfer of force to the objects to be conveyed or to a conveyor means. Conveyor means or the objects to be conveyed are able to be conveyed along a conveyor path by the driven means in a driven section of the driven unit. The driven means is mounted such that it is movable relative to the central body via a roller body which is mounted upon and circulates in an orbit around the central body. Thereby the driven means rolls upon the central body over rollers of the roller body, and thus the roller body transmits radial pressure forces to the central body. The driven means is driven directly by the drive means. The roller body itself is not driven directly by the drive means, but rather it is moved along solely by the rolling of the driven means upon the roller body (thus with half the speed of the driven means).

The conveyed objects are, for example, packaged goods or planar objects, in particular printed products, which are conveyed in the conveyor path individually or in a shingle stream. In case the objects are not themselves driven, the driven means engages with elements of a conveyor system, which in turn transports the conveyed objects.

It is possible thereby—in contrast to guide rollers or guide wheels, which can only allow a deflection over a circular segment—to direct and to drive the conveyed objects along (within certain limits) arbitrarily configurable curves. The central body and an orbital track of the roller body, and also a contact surface of the central body upon which the roller body rolls, can thus comprise an arbitrary course, in particular a non-circular course. The only substantial restrictions on the course are that a minimal radius of curvature must always be guaranteed, and that the torsion of the roller body is limited. With the orbital track running along a plane (as in the attached figures), no torsion of the roller body occurs. The roller body ensures a limited friction even with high normal forces, with a simultaneously simple construction: the pressure between driven means and central body is taken up by the rolling rollers, without a corresponding intrinsic heavy loading of the bearings of the axles of the rollers. This bearing simply serves to maintain the rollers apart from one another and to prevent them from falling out when in an unloaded state. The direct drive of the driven means results in an efficient transmission of power.

In a preferred embodiment of the invention, the roller body comprises a plurality of rollers connected in a linear manner, wherein the rollers are connected and kept apart from one another by means of a flexible and, in particular, also elastic connecting body. The connecting body, thus, forms a mobile bearing cage, also called a cage belt. To this end in a preferred embodiment of the invention the cage belt is flexible in at least two directions. For this purpose, the connecting body preferably comprises holding elements in which the rollers are set, and linking elements, which flexibly bind the holding elements together.

In a preferred embodiment of the invention the connecting body is one piece, for example formed of a plastic or textile and the rollers are inserted into the connecting body directly or via a bearing body or roller ring.

In a further preferred embodiment of the invention the rollers are one-piece and cylindrical, and bearing points opposing one another are formed on the inner sides of the holding elements. Prominent axle elements are formed on the rollers, particularly corresponding to the design of the bearing points. The rollers are set in the bearing points by means of the axle elements.

The concept of cylindricity encompasses, in particular, the form of a circular cylinder or a barrel-shaped, bulging cylinder, or an indented cylinder. The rollers are preferably one-piece and formed of metal or plastic.

For further embodiments of roller bodies and their rollers and connecting bodies (e.g. ball shaped rollers, which are snapped into a bearing body in a flat band) reference is be made to WO 2006/094423, whose contents are hereby incorporated by reference in the present application.

Preferably the drive unit is implemented as a lightweight construction, with rollers of, for example, plastic and the central body of plastic or aluminum. For heavier loads, the rollers can, in principle, also be manufactured as solid cylinders or as shells of aluminum or of (sheet) steel. In this way, a smooth-running system with limited mass inertia and with limited energy requirements is created. Since no considerable frictional forces arise—pressure is taken up by the rollers without friction on an axle—the drive unit can be operated without lubricant and is therefore less susceptible to contamination.

In a preferred embodiment of the invention the driven means is a circulating belt. Preferably, the inner side of the belt, thus the side facing the roller body, is flat with respect to the direction of travel, and comprises on its outer side teeth or lugs. The belt can also be flat on its outer side, or substituted with individual ropes, for example of rubber or a plastic. The description "flat with respect to the direction of travel" does not preclude that the belt can have on its inner side projections or grooves that run parallel to the direction of travel. In this case, corresponding grooves or projections are formed in the rollers, such that the belt is in this manner laterally guided.

Preferably, the roller body and the driven means travel at some separation from one another for at least a section of their orbital track, preferably in a drive section. They are thus separated from one another in a radial direction, i.e. in a direction perpendicular to the contact surface of the orbital track. Thus, this section can function as a compensation section in order that manufacturing related or temperature related variations in the length of the driven means and roller body can be compensated for.

In a preferred embodiment of the invention the orbital track—and therewith also the course of the roller body and the driven means—comprises at least one concave segment. On the one hand, the drive means can engage the driven means in a concave drive section of the orbital track, wherein the drive means preferentially is a wheel, and the driven means partly wraps around the drive means in the drive section. On the other hand, the driven means can also comprise a concave segment in a driven section.

In a further preferred embodiment of the invention the driven means, as well as being supported in the radial direction from the inner side by at least one inner roller body, is also supported in the radial direction from the outer side by at least one outer roller body. The outer roller body thus runs circumferentially upon the outer side of the driven means. In this way the driven means is also mounted with limited friction in concave segments.

In a further preferred embodiment of the invention, the drive unit is furnished with an opposing unit, which lies opposite the drive unit with respect to the conveyor path in a driven section, and whose form is designed such that in a region of the driven section it corresponds to the form of the drive unit and, thus, defines a segment of the conveyor path. A concave section of the driven section corresponds thus to a convex section of the opposing unit, and vice-versa. The drive unit and the opposing unit can be elastically mounted against one another, in order to compensate for variations in the thickness of the conveyed material.

The opposing unit can also be a drive unit, or designed in a manner analogous to a drive unit, but without a drive means. The opposing unit can, however, also be a guide with fixed rollers, or simply a guide rail.

In a further preferred embodiment of the invention the orbital track and thereby also the roller body are twisted or warped in particular segments of the orbital track. Thereby a deflection of the conveyed objects is possible along a trajectory that runs in three dimensions (thus not only in a plane). In another preferred embodiment of the invention the drive unit itself is movable and moves relative to a stationary body due to the force that it fed in by the drive means.

Further preferred embodiments arise from the dependent claims.

BRIEF DESCRIPTION OF THE FIGURES

In the following, the object of the invention is described more fully with reference to preferred embodiments that are depicted in the included drawings. Each case shows schematically:

FIG. 3 a cross section through an orbital track;
FIG. 4 a cross section through an orbital track in another embodiment of the invention;
and
FIG. 5 a roller body.

The reference numerals used in the drawings and the meanings associated thereto are listed in the included reference list. In principle, in the figures, the same parts are given the same reference numerals.

DETAILED DESCRIPTION OF THE INVENTION

Figure 1:
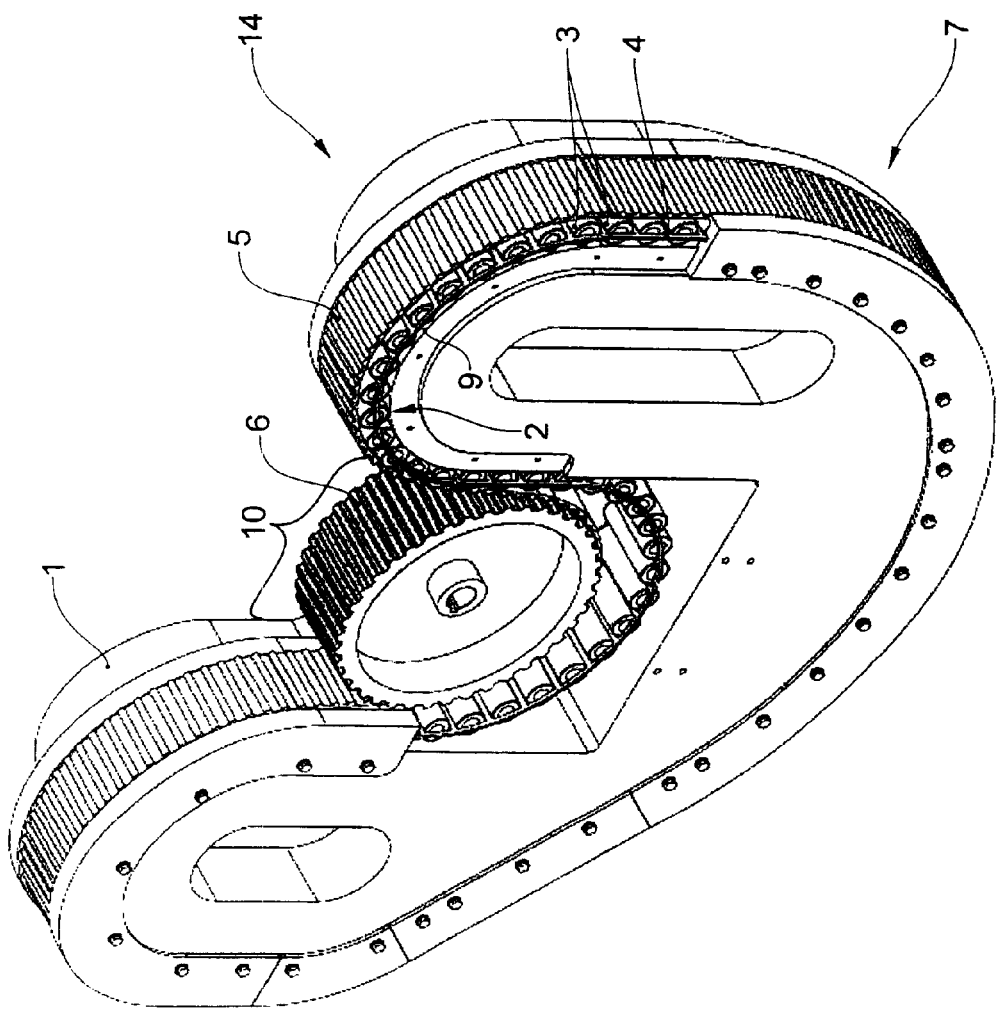
FIG. 1 a perspective view of a drive unit.
Figure 2:
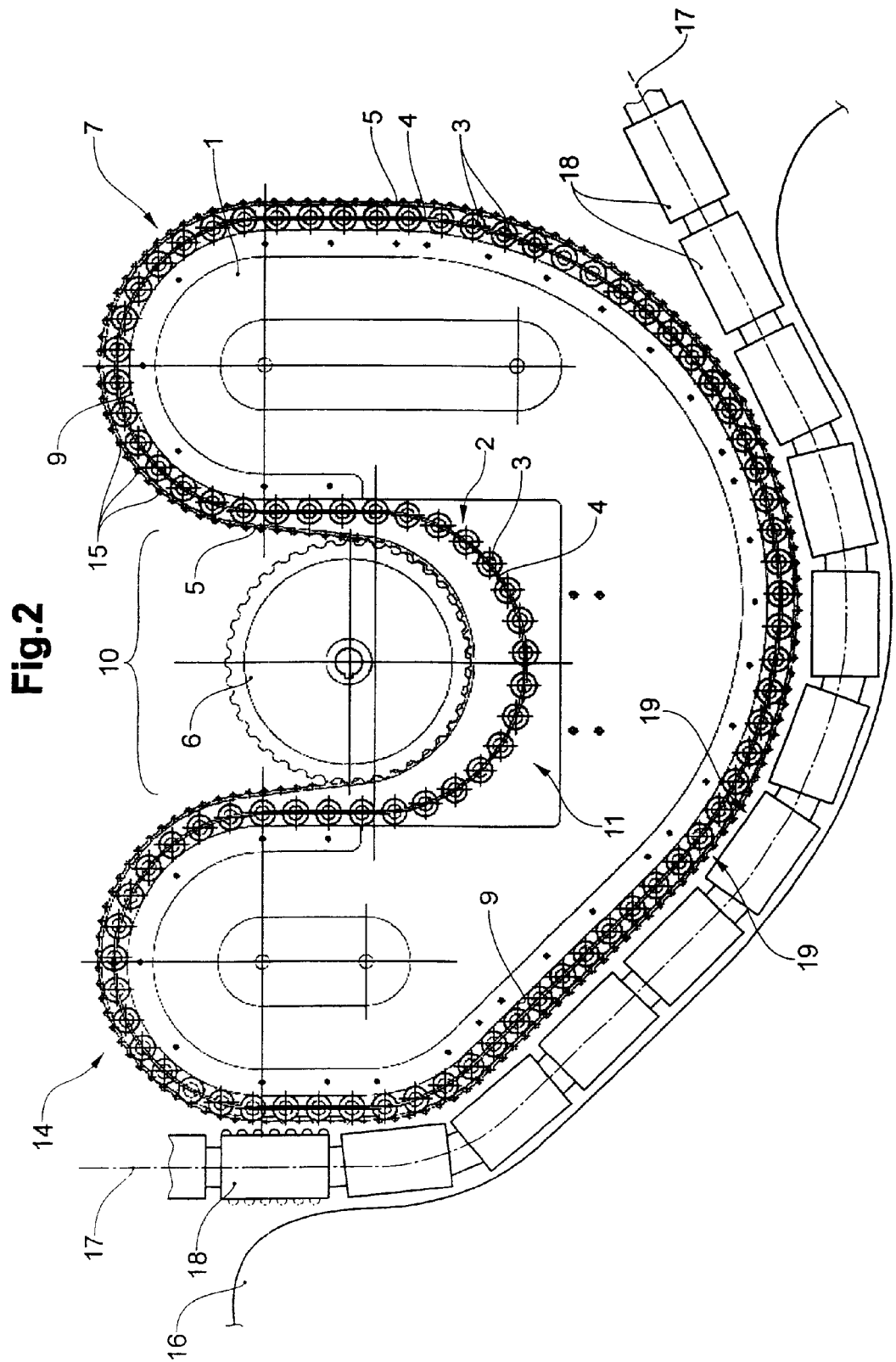
FIG. 2 a cross section through a drive unit.

FIG. 1 depicts a perspective view of a drive unit 14, and FIG. 2 a cross section through a drive unit 14. The drive unit 14 comprises a central body 1, with a roller body 2 that runs in an orbital track 7. The roller body 2 comprises a flexible cage belt 4 with rollers 3 mounted therein. The rollers 3 roll upon a contact surface 9 of the orbital track 7. A toothed belt 5 is mounted against the roller body 2 such that it can roll thereupon. The toothed belt 5 functions as the driven element for the driving of further objects not depicted here. The toothed belt can also—differently than is shown here—be formed as a lugged belt, i.e. with lugs 15 that are spaced more substantially apart from one another, corresponding for example to a timing gap of the objects to be conveyed.

The toothed belt 5 is driven by a drive wheel, preferably a gear wheel or pinion wheel. The toothed belt 5 loops around the drive wheel 6 in a drive section 10 of the drive unit 14. For this purpose, the orbital track 7 and the course of the toothed belt 5 and roller body 2 are designed to be concave in the drive section 10. Furthermore, in this area, the toothed belt 5 and the roller body 2 are spaced apart from one another radially. In this way, a compensation section 11 exists, in which length differences between the toothed belt 5 and the roller body 2 are compensated for. The drive wheel 6 is driven by a drive not depicted here. The drive wheel 6 can be mounted such that it is movable in a radial direction relative to the central body 1, with a spring or lockable. In this way the toothed belt 5 is tensible via movement of the drive wheel 6 against the central body 1.

In FIG. 2 are further depicted with respect to the drive unit 14: an opposing unit 16 and arranged therebetween conveyed objects (material to be conveyed) or conveyor system elements 18. The conveyor system elements 18 form for example a series of parts that are mutually pushed together or linked together. The form of the opposing unit 16 is designed such that in a driven section 19 it follows the form of the drive unit 14. The gap between the drive unit 14 and the opposing unit 16 thus defines a course of a conveyor path 17. The opposing unit 16 can for example be:

a guide rail;
a movable belt;
a drive unit 14 as described before;
a deflection unit, substantially corresponding to a drive unit 14 but without a drive wheel; or
a deflection unit, substantially corresponding to a drive unit 14 with a freely-rotating, non-driven wheel in the place of the drive wheel. This revolving wheel tensions the toothed belt 5.

In optional concave sections of the drive unit (not shown) the opposing unit 16 holds the roller body 2 and the toothed belt against the central body 1 via the conveyed material 18. The conveyor system elements 18 can also comprise a tooth system on one side or both sides which corresponds to the toothing of the tooth belt 5.

FIG. 3 depicts a cross section through an orbital track. The cage belt 4 is routed loosely in lateral grooves 8 in the orbital track 7. In this way, in situations in which it is not already drawn into the orbital track 7 by the toothed belt 5, the cage belt 4 is protected from radially moving out of the orbital track 7. The orbital track 7 guides the roller body 2 and, preferably, also the toothed belt 5 in the lateral direction, thus perpendicular to the direction of movement and perpendicular to the contact surface 9.

FIG. 4 depicts a cross section through an orbital track in a further embodiment of the invention. Here the toothed belt 5 is mounted such that it rolls between an inner roller body 12 and an outer roller body 13. These two roller bodies are designed such that they are analogous to the roller body 2 previously described. The function of the inner roller body 12 is the same as that of the one described previously. The outer roller body 13 effects a rolling bearing of the toothed belt 5 in concave sections of the orbital track 7. For this purpose the outer roller body 13 is preferably designed in two pieces, with respectively one piece for each of the lateral sections 20 of the toothed belt 5.

FIG. 5 depicts a roller body, with a top view of a section of a cage belt or roller belt 4, with partly inset rollers 3, and with a part of the orbital track 7. The roller belt 4 comprises successive openings 21, wherein each opening 21 comprises on each side of the band respectively an inwardly projecting bearing protrusion 22. The rollers 3 are furnished at their axial ends with indentations 23, such that the bearing protrusions 22 of the flexible roller belt 4 snap into the indentations 23 or can be introduced therein. The roller belt 4 is on the one hand flexible to such an extent that it can bend to follow the circumference of the central body 1, and on the other hand stable or stiff enough that the rollers 3 are held in place in the openings 21 by the introduction of the bearing protrusions 22. As a rule, the bearing protrusions 22 carry only the dead weight of the rollers 3.

LIST OF REFERENCE NUMERALS

1. Central body
2. Roller body
3. Roller
4. Cage Belt
5. Toothed belt
6. Drive wheel, gear wheel, pinion wheel
7. Orbital track
8. Groove
9. Contact surface
10. Drive section
11. Compensation section
12. Inner roller body
13. Outer roller body
14. Drive unit
15. Tooth, lug
16. Opposing unit
17. Conveyor path
18. Conveyed material, Conveyor system elements
19. Driven section
20. Lateral section
21. Openings
22. Bearing protrusion
23. Indentation

The invention claimed is:

1. In a conveyor for conveying a plurality of objects, a drive for conveyor means or conveyed objects, comprising:
    a drive unit,
    wherein the drive unit comprises a central body, a drive means and a driven means circulating around the central body,
    wherein conveyor means or the objects to be conveyed are able to be conveyed in a driven section of the drive unit along a conveyor path by way of the driven means,
    wherein the driven means is mounted with respect to the central body by means of a roller body which circulates around the central body in an orbital track,
    wherein the driven means rolls upon the central body over rollers of the roller body and thus the roller body transmits radial pressure force to the central body,
    wherein the driven means is driven directly by the drive means, and the roller body itself is not driven directly by the drive means, but rather is only moved via the rolling of the driven means on the roller body.

2. The drive according to claim 1, wherein the roller body comprises a circulating flexible connecting body, with rollers held therein.

3. The drive according to claim 1, wherein the driven means is a circulating belt.

4. The drive according to claim 3, wherein the inner side of belt, thus the side facing the roller body, is flat with respect to the direction of travel.

5. The drive according to claim 3, wherein the belt comprises teeth or lugs on the outer side.

6. The drive according to claim 1, wherein the orbital track comprises an arbitrary course, in particular a non-circular course.

7. The drive according to claim 1, wherein the orbital track comprises at least one concave segment.

8. The drive according to claim 7, wherein the drive means engages the driven means in a concave drive section of the orbital track.

9. The drive according to claim 8, wherein the drive means is a wheel, and the driven means partly wraps around the drive means in the drive section.

10. The drive according to claim 6, wherein the driven means comprises a concave segment in a driven section.

11. The drive according to claim 1, wherein the driven means as well as being supported in the radial direction from the inner side by at least one inner roller body, is also supported in the radial direction from the outer side by at least one outer roller body.

12. The drive according to claim 1, wherein the drive unit is furnished with an opposing unit, which lies opposite the drive unit with respect to the conveyor path in the driven section, and whose shape in a region of the driven section corresponds to the shape of the driven section and thus defines a segment of the conveyor path.

13. The drive according to claim 12, wherein the opposing unit is also a drive unit, or is designed in a manner analogous to a drive unit, but without a driven drive means.

14. A drive for conveyor means or conveyed objects, comprising:
    a drive unit,
    wherein the drive unit comprises a central body, a drive means and a driven means circulating around the central body,
    wherein conveyor means or the objects to be conveyed are able to be conveyed in a driven section of the drive unit along a conveyor path by way of the driven means,
    wherein the driven means is mounted with respect to the central body by means of a roller body which circulates around the central body in an orbital track,
    wherein the driven means rolls upon the central body over rollers of the roller body and thus the roller body transmits radial pressure force to the central body,
    wherein the driven means is driven directly by the drive means, and the roller body itself is not driven directly by the drive means, but rather is only moved via the rolling of the driven means on the roller body, and
    wherein the roller body and the driven means run at some distance apart from one another for at least one section of their orbital track, in a drive section.

15. A drive for conveyor means or conveyed objects, comprising:
    a drive unit,
    wherein the drive unit comprises a central body, a drive means and a driven means circulating around the central body,
    wherein conveyor means or the objects to be conveyed are able to be conveyed in a driven section of the drive unit along a conveyor path by way of the driven means,
    wherein the driven means is mounted with respect to the central body by means of a roller body which circulates around the central body in an orbital track,
    wherein the driven means rolls upon the central body over rollers of the roller body and thus the roller body transmits radial pressure force to the central body, wherein the driven means is driven directly by the drive means, and the roller body itself is not driven directly by the drive means, but rather is only moved via the rolling of the driven means on the roller body, and wherein the driven means comprises an inner side and an outer side, the inner side of the driven means faces the roller body, and the drive means is located completely outside of the driven means and drives the driven means at the outer side of the driven means.

* * * * *